United States Patent
Koser et al.

(10) Patent No.: US 9,646,316 B2
(45) Date of Patent: May 9, 2017

(54) TECHNIQUES FOR DEPLOYMENT OF UNIVERSAL PROMOTION CONDITIONS FOR OFFER EVALUATIONS

(75) Inventors: Vincent Robert Koser, West Lafayette, IN (US); George Mark McGregor, Pine Village, IN (US)

(73) Assignee: NCR Corporation, Duluth, GA (US)

( * ) Notice: Subject to any disclaimer, the term of this patent is extended or adjusted under 35 U.S.C. 154(b) by 330 days.

(21) Appl. No.: 13/601,263

(22) Filed: Aug. 31, 2012

(65) Prior Publication Data
US 2014/0067495 A1    Mar. 6, 2014

(51) Int. Cl.
*G06Q 30/00* (2012.01)
*G06Q 30/02* (2012.01)

(52) U.S. Cl.
CPC .................. *G06Q 30/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,315,909 B1* | 11/2012 | Barker | .................. | G06Q 20/20 705/14.38 |
| 8,498,898 B1* | 7/2013 | Kogen | .................. | G06Q 30/02 705/14.1 |
| 2002/0082912 A1* | 6/2002 | Batachia | ............ | G06Q 30/0239 705/14.39 |
| 2003/0130899 A1* | 7/2003 | Ferguson | ........... | G06Q 30/0601 705/26.1 |
| 2003/0191765 A1* | 10/2003 | Bargh | ....................... | G06F 8/34 |
| 2003/0212595 A1* | 11/2003 | Antonucci | ............. | G06Q 30/02 705/14.27 |
| 2006/0190310 A1* | 8/2006 | Gudla | .................... | G06Q 10/04 705/7.11 |
| 2007/0073588 A1* | 3/2007 | Baker | .................... | G06Q 20/10 705/14.35 |
| 2007/0174115 A1* | 7/2007 | Chieu | .................... | G06Q 30/02 705/14.25 |
| 2007/0266366 A1* | 11/2007 | Bucuvalas | .............. | G06F 8/433 717/104 |
| 2008/0168082 A1* | 7/2008 | Jin | ............................ | G06F 8/20 |
| 2009/0031426 A1* | 1/2009 | Dal Lago | ............ | G06F 21/6245 726/26 |
| 2009/0055341 A1* | 2/2009 | Bidkar | .................... | G06Q 30/02 706/47 |
| 2009/0164364 A1* | 6/2009 | Galit | ...................... | G06Q 20/10 705/38 |
| 2009/0183179 A1* | 7/2009 | Keith | ...................... | G06Q 30/02 719/318 |
| 2010/0106598 A1* | 4/2010 | Grimes | .................. | G06Q 30/02 705/14.53 |
| 2010/0153218 A1* | 6/2010 | Wilson | .................. | G06Q 30/02 705/14.72 |

(Continued)

Primary Examiner — Matthew T Sittner
(74) Attorney, Agent, or Firm — Schwegman, Lundberg & Woessner

(57) ABSTRACT

Techniques for universal promotion conditions for offer evaluations are provided. Promotions are comprised of promotion conditions. The conditions are defined as a key value, description, and data type. Defined operators for the data types are enumerated and the key values can be mixed and matched in custom defined conditional statements to expand promotional engines with universal promotion conditions.

11 Claims, 3 Drawing Sheets

(56) References Cited

U.S. PATENT DOCUMENTS

| | | | |
|---|---|---|---|
| 2010/0169174 A1* | 7/2010 | Anderson | G06Q 10/10 705/14.45 |
| 2010/0287015 A1* | 11/2010 | Au | G06Q 10/063 705/7.11 |
| 2011/0208576 A1* | 8/2011 | Durgin | G06Q 30/02 705/14.38 |
| 2011/0313844 A1* | 12/2011 | Chandramouli | G06Q 30/0241 705/14.42 |
| 2012/0232971 A1* | 9/2012 | Pabst | G06Q 30/0207 705/14.12 |
| 2012/0271692 A1* | 10/2012 | Huang | G06Q 30/06 705/14.23 |
| 2012/0284107 A1* | 11/2012 | Gernaat | G06Q 30/0207 705/14.26 |
| 2013/0054343 A1* | 2/2013 | Koser | G06Q 30/0261 705/14.33 |
| 2013/0179917 A1* | 7/2013 | Gu | G06Q 30/02 725/32 |
| 2013/0325580 A1* | 12/2013 | Koser | G06Q 30/0207 705/14.33 |
| 2014/0067495 A1* | 3/2014 | Koser | G06Q 30/02 705/14.4 |

\* cited by examiner

TECHNIQUES FOR DEPLOYMENT OF UNIVERSAL PROMOTION CONDITIONS FOR OFFER EVALUATIONS

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, Wi-Fi communication, and the like.

In large part due to the advancement and use of technology coupled with the adoption of kiosks, enterprises are trying to find new mechanisms to reach consumers with offers for their goods and services that use the current technology effectively and that are capable of being used by consumers via their own devices or kiosks.

Traditional offer management systems require modifications for deployment of new offer functionality. These modifications require extensive testing and affect numerous other existing components of the offer management systems, since new functionality is tightly coupled to the existing infrastructure. Because of the tightly coupled environments, making any modification to provide new offer functionality becomes a risky proposition when the enterprise wants to deploy the new offer functionality into live retail environments or into newer technology and platforms.

SUMMARY

In various embodiments, techniques for deployment of universal promotion conditions for offer evaluations are presented. According to an embodiment, a method for deployment universal promotion conditions is provided.

Specifically, a promotion engine is configured to accept unique pairs of information having a variable identifier and a data type. Operators for each data type are provided to the promotion engine. Finally, the promotion engine is delivered to one or more devices for installation and dynamic evaluation of the unique pairs of information organized in custom statements to resolve enterprise offer decisions for consumers.

DETAILED DESCRIPTION

Figure 1:
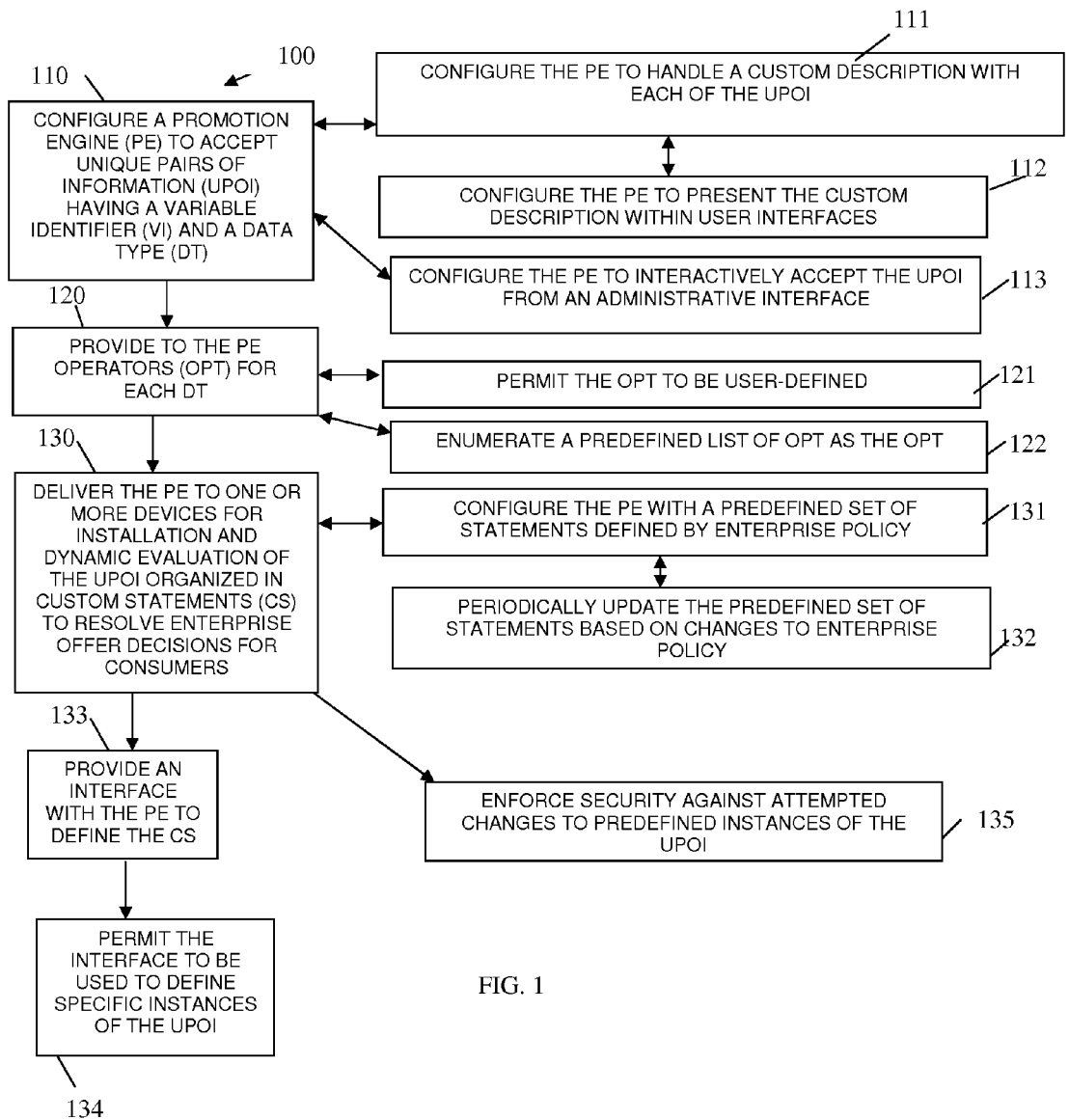
FIG. 1 is a diagram of a method for deployment of universal promotion conditions, according to an example embodiment.

FIG. 1 is a diagram of a method 100 for deployment of universal promotion conditions, according to an example embodiment. The method 100 (hereinafter "condition deployment manager") is implemented as instructions programmed and residing on a non-transitory computer-readable (processor-readable) storage medium and executed by one or more processors (e.g., server, cloud, virtual machine (VM), etc.) over a network connection. The processors are specifically configured and programmed to process the condition deployment manager. The condition deployment manager operates over a network. The network is wired, wireless, or a combination of wired and wireless.

The condition deployment manager executes on one or more processors of over a network connection. The conditions once deployed interact over the network connection with a variety of devices, such as: a mobile device (via an app, may also be referred to as a "mobile agent" herein), a checkout system (self-service kiosk or cashier-manned station), a website, and the like.

In an embodiment, the condition deployment manager is accessible via a cloud processing environment over the Internet. The cloud processing environment includes one or more processing environments configured to deploy and operate the condition deployment manager via an Internet connection having Application Programming Interfaces (APIs) to interact with a variety of point-of-sale (POS) devices (customer's mobile device, checkout station (self-service kiosk or cashier-manned station), website, and the like.

Various embodiments of the invention provide a technique for expanding legacy promotion engines in a dynamic and on-the-fly manner by the deployment of universal promotion conditions.

Specifically, the universal promotion conditions optionally allow the configuration and setup of testable reusable key value pairs, called universal conditions, in an enterprise offer management system.

These include several configuration options, such as the following as an example:
 ExternalID
 Description
 DataType
An example of this is the following two configured Universal Conditions (ExternalID Description DataType):
 ItemInventory Item Inventory Count Remaining Integer
 CashierLevel The seniority rank of the cashier from level 1 to manager Integer An unlimited number of testable universal conditions may be entered in an administrative section of an offer management tool. These universal conditions may then be leveraged as a condition for an offer setup.

An example offer condition leveraging the above values can be used to create an offer using the following values sent from the POS terminal during the transaction.

If Item-Inventory-Count of the purchased-item is below 3 and the person checking out the merchandise is a seniority rank of manager distribute a reward of a cashier message to alert the manager that inventory of the item is nearly depleted.

The offer condition configuration screen allows the following configuration to test the combinations of universal conditions configured.
Conditionals:
 Greater than
 Less than
 Greater than or equal to
 Greater than or less to
 Range
 Equal Level of application:
 Transaction Level
 Item Level
Any combination of any number of these universal conditions can be setup to evaluate as an offer condition in conjunction with any other pre-existing offer conditions, such as item cost, item count, point balance, member identifier, etc.

For our example the condition is setup as:
Level of application: Item Level
 CashierLevel >=5 (assuming 5 is manager level)
  And
 ItemInventory <3

The universal promotion engine interface is capable of accepting these configured offer conditions and then processing the conditional test(s) based on the application of the values sent from the POS terminal in real time during the transaction.

An example payload of the universal conditions from the POS terminal as sent to the promotion engine can be as follows: [standard message header] ItemLinkCode|ItemInventory:2,CashierLevel:3[standard message trailer].

The ItemLinkCode can be interpreted to determine if the message being sent applies those values to an item in the transaction or to the transaction as a whole at the basket level.

IF an enterprise offer management system is not present these types of offer conditions may still be leveraged in the direct engine interface for offer configuration.

It is within this context, that the processing of the condition deployment manager is discussed within reference to the FIG. 1.

At 110, the condition deployment manager configures a promotion engine to accept unique pairs of information. Each pair of information having a variable identifier and a data type. This situation was described above.

According to an embodiment, at 111, the condition deployment manager configures the promotion engine to handle a custom description with each of the unique pairs of information. Again, the description attribute of the information was presented above in detail.

Continuing with the embodiment of 111 and at 112, the condition deployment manager configures the promotion engine to present the custom description within user-interfaces. This permits reporting and interactive evaluation of the unique pairs of information by resources such as administrators.

In an embodiment, at 113, the condition deployment manager configures the promotion engine to interactively accept the unique pairs of information from an administrative interface.

At 120, the condition deployment manager provides to the promotion engine operators for each data type. Again, some example data types and their operators were discussed above in the pre-context to the discussion of the condition deployment manager.

According to an embodiment, at 121, the condition deployment manager permits the operators to be user defined.

In another case, at 122, the condition deployment manager enumerating a predefined list of operators as the operators.

At 130, the condition deployment manager delivers the promotion engine to one or more devices for installation and dynamic evaluation of the unique pairs of information organized in custom statements to resolve enterprise offer devices for consumers. Installation of such a promotion engine is described below with reference to the FIG. 2.

In an embodiment, at 131, the condition deployment manager configures the promotion engine with a predefined set of statements defined by enterprise policy.

Continuing with the embodiment of 131 and at 132, the condition deployment manager periodically updates the predefined set of statements based on changes in the enterprise policy.

In another case, at 133, the condition deployment manager provides an interface with the promotion engine to define the custom statements.

Continuing with the embodiment of 133 and at 134, the condition deployment manager permits the interface to be used to define specific instances of the unique pairs of information.

Still continuing with the embodiment of 134 and at 135, the condition deployment manager enforces security against attempted changes to predefined instances of the unique pairs of information.

Figure 2:
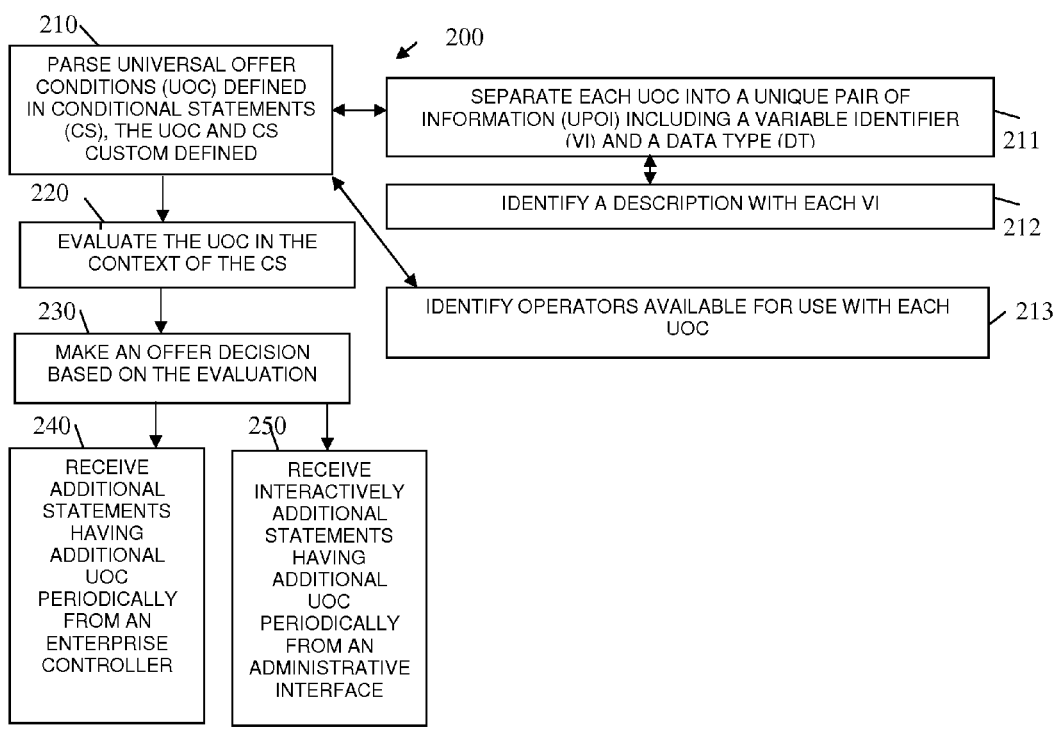
FIG. 2 is a diagram another method for deployment of universal promotion conditions, according to an example embodiment.

FIG. 2 is a diagram another method 200 for deployment of universal promotion conditions, according to an example embodiment. The method 200 (hereinafter "promotion evaluation agent") is implemented as instruction and programmed within a non-transitory computer-readable (processor-readable) storage medium that executes on one or more processors of a Point-of-Sale (POS) device, such as: a consumer's mobile device (e.g., smart phone, tablet, PDA, laptop, etc.), a self-service kiosk device, a cashier-manned device, or any computing device for which the customer offer can be delivered (for example within a browser on a desktop computer, laptop, etc.); the processors of these devices are specifically configured to execute the promotion evaluation agent. The promotion evaluation agent is also operational over a network; the network is wired, wireless, or a combination of wired and wireless.

The promotion evaluation agent interacts with the universal promotion conditions described and deployed by the condition deployment manager (discussed above with reference to the FIG. 1) to provide novel techniques for processing universal promotion conditions in offer evaluations for consumers.

The promotion evaluation agent may be viewed as the promotion engine discussed above with reference to the FIG. 1.

At 210, the promotion evaluation agent parses universal offer conditions defined in conditional statements. The universal offer conditions and the conditional statements custom defined. The universal offer conditions may be viewed as the unique pairs of information discussed above with reference to the FIG. 1.

According to an embodiment, at 211, the promotion evaluation agent separates each universal offer condition into a unique pair of information that includes a variable identifier and a data type.

Continuing with the embodiment of 211 and at 212, the promotion evaluation agent identifies a description with each variable identifier.

In another situation, at 213, the promotion evaluation agent identifies operators available for use with each universal offer condition.

At 220, the promotion evaluation agent evaluates the universal offer conditions in the context of the conditional statements.

At 230, the promotion evaluation agent makes an offer decision based on the evaluation.

According to an embodiment, at 240, the promotion evaluation agent receives additional universal offer conditions periodically from an enterprise controller. The enterprise controller keeping enterprise offers in synchronization across channels and platforms.

In still another case, at 250, the promotion evaluation agent interactively receives additional statements having additional universal offer conditions from an administrative interface.

Figure 3:
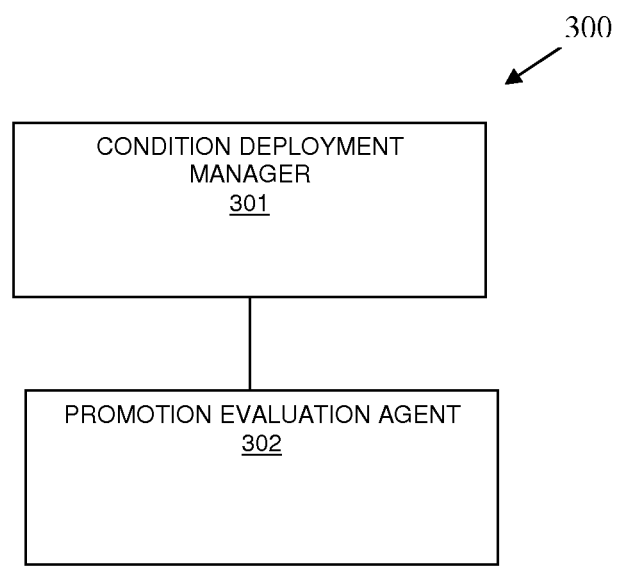
FIG. 3 is a diagram of a universal promotion condition deployment system, according to an example embodiment.

FIG. 3 is a diagram of a universal promotion condition deployment system 300, according to an example embodiment. The components of the universal promotion condition deployment system 300 are implemented as executable instructions and programmed within a non-transitory computer-readable (processor-readable) storage medium that execute on one or more processors of an enterprise server system and one or more processors of a device where custom offers are redeemed and handled as discussed above with reference to the FIG. 2; the processors of these devices are specifically configured to execute the components of the universal promotion condition deployment system 300. The universal promotion condition deployment system 300 is also operational over a network; the network is wired, wireless, or a combination of wired and wireless.

The universal promotion condition deployment system 300 includes a condition deployment manager 301 and a promotion evaluation agent 302. Each of these components and their interactions with one another will now be discussed in turn.

The universal promotion condition deployment system 300 includes one or more processors of an enterprise (retail-based) server, the processors configured with the condition deployment manager 301, which is implemented, programmed, and resides within a non-transitory computer-readable storage medium and executes on the one or more processors. Example processing associated with the condition deployment manager 301 was presented in detail above with reference to the FIG. 1.

The condition deployment manager 301 is configured to configure the promotion evaluation agent 302 to process universal offer conditions defined in custom statements.

The universal promotion condition deployment system 300 also includes one or more POS devices, each of which are configured with an instance of the promotion evaluation agent 302, which is implemented in a non-transitory computer-readable storage medium and that executes on one or more processors of the POS devices.

The promotion evaluation agent 302 is configured to dynamically evaluate the custom statements with the universal offer conditions to make dynamic decisions on offers for the consumers.

According to an embodiment, the promotion evaluation agent 302 is a distributed promotion engine.

Continuing with the previous embodiment, the distributed promotion engine includes an administrative interface to custom define specific instances of the universal offer conditions and the custom statements on the POS device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for deployment of universal promotion conditions, the method programmed as executable instructions in a non-transitory computer-readable storage and executed by one or more hardware processors of a hardware server configured to execute the method, comprising:

configuring, by the server, a promotion engine as executable instructions within a non-transitory computer-readable storage medium for delivery to and execution by a Point-Of-Sale (POS) device, and wherein configuring further includes configuring the promotion engine for dynamically processing unique pairs of information with a purchased item from the POS device during transactions with the unique pairs of information organized in statements by an enterprise associated with the POS device, the statements having the unique pairs of information organized with conditions and dynamically valuated by the promotion engine when delivered to the POS device for dynamically resolving, by the promotion engine executing on the POS device, identifying specific promotions available for any of the transactions being processed at the POS device, wherein each unique pair of information includes a variable identifier and a data type, and wherein the promotion engine executes on the POS device when deployed to the POS device providing, by the server, to the promotion engine operators for each data type for processing by the promotion engine with the statements, wherein the operators when processed by the promotion engine on the POS device with the unique pairs of information having the conditions dynamically resolve the specific promotions available for any of the transactions being processed at the POS device;

delivering, from the server, the promotion engine to the POS device for installation on the POS device, execution on the POS device; and executing, the promotion engine on the POS device, providing dynamic evaluation on the POS device of the unique pairs of information organized in the statements with the conditions and the operators for dynamically resolving the specific promotions in the transactions occurring at the POS device.

2. The method of claim 1, wherein configuring further includes configuring the promotion engine to handle a custom description with each of the unique pair of information.

3. The method of claim 2, wherein configuring further includes configuring the promotion engine to present the custom description within user-interfaces.

4. The method of claim 1, wherein configuring further includes configuring the promotion engine to interactively accept the unique pairs of information from an administrative interface.

5. The method of claim 1, wherein providing further includes permitting the operators to be user-defined.

6. The method of claim 1, wherein providing further includes enumerating a predefined list of operators as the operators.

7. The method of claim 1, wherein delivering further includes configuring the promotion engine with a predefined set of statements defined by enterprise policy.

8. The method of claim 7 further comprising, periodically updating the predefined set of statements based on changes in the enterprise policy.

9. The method of claim 1, wherein delivering further includes providing an interface with the promotion engine to define the statements.

10. The method of claim 1, wherein providing further includes permitting the interface to be used to define specific instances of the unique pairs of information.

11. The method of claim 10, wherein permitting further includes enforcing security against attempted changes to predefined instances of the unique pairs of information.

* * * * *